United States Patent
Cui et al.

(10) Patent No.: US 12,389,364 B2
(45) Date of Patent: Aug. 12, 2025

(54) COLLECTING UE POSITIONING INFORMATION IN A NON-TERRESTRIAL NETWORK

(71) Applicant: Apple Inc., Cupertino, CA (US)

(72) Inventors: Jie Cui, San Jose, CA (US); Dawei Zhang, Saratoga, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 258 days.

(21) Appl. No.: 17/822,500

(22) Filed: Aug. 26, 2022

(65) Prior Publication Data

US 2023/0065533 A1    Mar. 2, 2023

Related U.S. Application Data

(60) Provisional application No. 63/260,860, filed on Sep. 2, 2021.

(51) Int. Cl.
*H04W 64/00* (2009.01)
*G01S 19/48* (2010.01)
*H04B 7/185* (2006.01)

(52) U.S. Cl.
CPC ........... *H04W 64/003* (2013.01); *G01S 19/48* (2013.01); *H04B 7/18506* (2013.01)

(58) Field of Classification Search
CPC ...... H04W 64/003; G01S 19/48; G01S 19/00; G01S 5/0036; G01S 5/0226;
(Continued)

(56) References Cited

U.S. PATENT DOCUMENTS

| 2016/0233949 A1 | 8/2016 | Tillet et al. |
| 2018/0262265 A1 | 9/2018 | Hyslop |

(Continued)

FOREIGN PATENT DOCUMENTS

| CN | 111010708 | 4/2020 |
| WO | 2020/099919 | 5/2020 |
| WO | 2021/058478 | 4/2021 |

OTHER PUBLICATIONS

CMCC, "Discussion on implicit compatibility to support ATG scenarios in NTN", 3GPP TSG RAN WG1 102 e, R1 2006213, Aug. 28, 2020, 9 sheets.

*Primary Examiner* — Farid Seyedvosoghi
(74) *Attorney, Agent, or Firm* — Fay Kaplun & Marcin, LLP

(57) ABSTRACT

A user equipment (UE) configured to collect UE positioning information configured to indicate a location of the UE, wherein the UE is deployed onboard an airplane and report the UE positioning information to a cell of a non-terrestrial network (NTN). Also, a user equipment (UE) configured to receive a request for uplink positioning reference signals, wherein the uplink positioning reference signals are to indicate a location of the UE and wherein the UE is deployed on an airplane and transmit the uplink positioning reference signals to a cell of a non-terrestrial network (NTN).

20 Claims, 10 Drawing Sheets

(58) Field of Classification Search
CPC ........ G01S 5/0236; G01S 5/0027; G01S 5/10; H04B 7/18506; H04B 7/18508
See application file for complete search history.

(56) References Cited

U.S. PATENT DOCUMENTS

| | | |
|---|---|---|
| 2020/0028572 A1* | 1/2020 | Gaske .................... H04W 64/00 |
| 2020/0120445 A1* | 4/2020 | Ramasamy ............ H04W 4/027 |
| 2020/0229122 A1* | 7/2020 | Kim ....................... H04W 64/00 |
| 2020/0359234 A1 | 11/2020 | Maattanen et al. |
| 2021/0345215 A1 | 11/2021 | Sun et al. |
| 2023/0251342 A1* | 8/2023 | Zhu ........................ G01S 13/765 |
| | | 455/456.1 |
| 2024/0334533 A1* | 10/2024 | Li ............................ H04W 4/02 |

* cited by examiner

COLLECTING UE POSITIONING INFORMATION IN A NON-TERRESTRIAL NETWORK

PRIORITY/INCORPORATION BY REFERENCE

This application claims priority to U.S. Provisional Application Ser. No. 63/260,860 entitled, "Group Positioning," filed on Sep. 2, 2021, the entirety of which is incorporated by reference herein.

BACKGROUND

A user equipment (UE) may connect to a non-terrestrial network (NTN). An NTN may generally refer to any network that may involve a non-terrestrial flying object, e.g., satellite communication networks, high altitude platform systems, air-to-ground (ATG) networks, etc. It has been identified that there is a need for mechanisms related to collecting UE positioning information in the NTN.

SUMMARY

Some exemplary embodiments are related to a processor of a user equipment (UE) configured to perform operations. The operations include collecting UE positioning information configured to indicate a location of the UE, wherein the UE is deployed onboard an airplane and reporting the UE positioning information to a cell of a non-terrestrial network (NTN).

Other exemplary embodiments are related to a processor of a user equipment (UE) configured to perform operations. The operations include receiving a request for uplink positioning reference signals, wherein the uplink positioning reference signals are to indicate a location of the UE and wherein the UE is deployed on an airplane and transmitting the uplink positioning reference signals to a cell of a non-terrestrial network (NTN).

Still further exemplary embodiments are related to a processor of a user equipment (UE) configured to perform operations. The operations include reporting group information indicating that the UE is part of a group of UEs, the group of UEs comprising at least the UE and a second UE, collecting UE positioning information, the UE positioning information comprising information associated with at least the UE and reporting the UE positioning information to a non-terrestrial network (NTN).

Additional exemplary embodiments are related to a processor of a user equipment (UE) configured to perform operations. The operations include reporting group information indicating that the UE is part of a group of UEs, the group of UEs comprising at least the UE and a second UE and transmitting uplink positioning reference signals to a cell of a non-terrestrial network (NTN).

DETAILED DESCRIPTION

Figure 1:
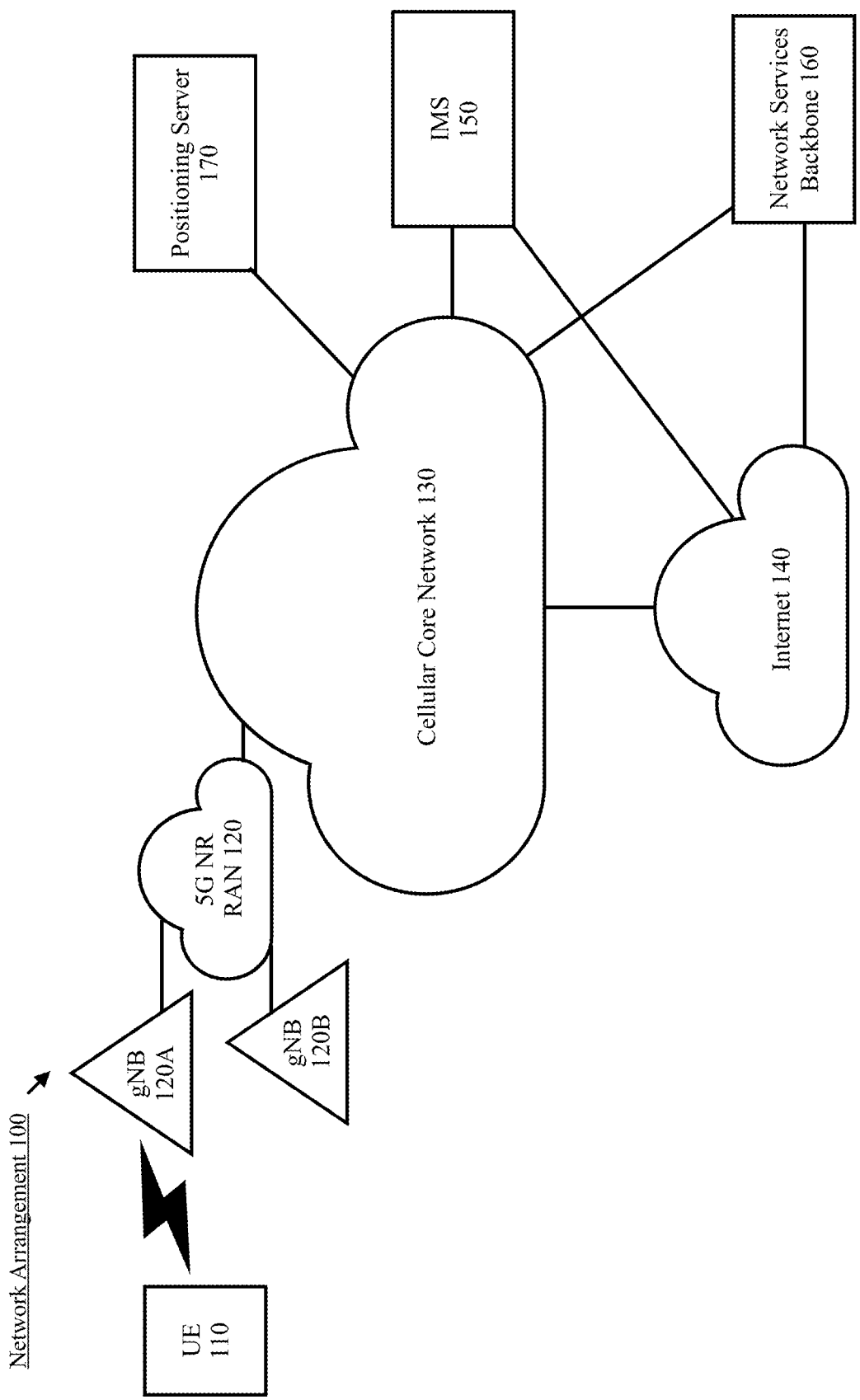
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to collecting and reporting user equipment (UE) positioning information in a non-terrestrial network (NTN).

The exemplary embodiments are described with regard to a UE. However, reference to a UE is merely provided for illustrative purposes. The exemplary embodiments may be utilized with any electronic component that is equipped with the hardware, software, and/or firmware to wirelessly exchange signals with a network and/or another remote device. Therefore, the UE as described herein is used to represent any electronic component.

The exemplary embodiments are also described with regard to an NTN. Those skilled in the art will understand that the term "NTN" may generally refer to any network that may involve non-terrestrial flying objects, e.g., satellite communication networks, high altitude platform systems, air-to-ground (ATG) networks, unmanned aerial vehicle (UAV) networks, etc. In the examples provided below, the NTN network may be supported by a fifth generation (5G) system. For example, one or more satellites may provide a UE with access to the 5G network or a next generation node B (gNB) may be configured to support ATG communication. However, the exemplary embodiments are not limited to utilizing a 5G system integrated with the NTN. The exemplary embodiments may be utilized with (or without) any other appropriate type of network configured to support the NTN.

According to some aspects, the exemplary embodiments introduce mechanisms for collecting positioning information from a UE located on an airplane. Airplanes are equipped with a global positioning system (GPS) and/or global navigation satellite system (GNSS) for navigation. The airplane may relay its positioning information to air traffic control (ATC) using a satellite link and/or a base station configured to support ATG communication. It has been identified that there is a need for alternate approaches in case an issue occurs that prevents the airplane from relaying its positioning information to ATC. For example, an event may occur that intentionally or unintentionally causes the airplane to go radio silent and as a result, there may be no way for ATC to directly locate the airplane via the airplane's transceiver. The exemplary embodiments introduce mechanisms for collecting UE positioning information from one or more UEs located on the airplane. While this information may be used to assist in locating an airplane within the context of the example scenario described above, e.g., radio silent airplane, the exemplary embodiments are not limited to any particular type of scenario or conditions during which UE positioning information is collected.

In addition, the exemplary embodiments introduce techniques for collecting and reporting positioning information from a group of UEs. It has been identified that when multiple UEs gather in a certain area (e.g., airplane, train, bus, building, field, etc.), group positioning information may be utilized rather than individual UE positioning information to minimize signaling overhead and improve positioning accuracy. In the exemplary embodiments described below, the UEs in a group may be connected to one another using a non-cellular method (e.g., sidelink, short-range communication protocol, Bluetooth, Bluetooth low energy (BLE), etc.) and one or more UEs in the group may provide the group positioning information to the cellular network. The exemplary mechanisms and techniques introduced herein may be used independently from one another, in conjunction with other currently implemented mechanisms for collecting UE positioning information, future implementations of mechanisms for collecting UE positioning information or independently from other mechanisms for collecting UE positioning information.

In some examples, UEs may communicate with one another using a short-range communication protocol. Those skilled in the art will understand that a short-range communication protocol that enables short-range communication between two or more devices. Various examples described herein may reference Bluetooth (e.g., Bluetooth, Bluetooth Low-Energy (BLE), etc.), which is a specific type of short-range communication protocol. However, the exemplary embodiments may be implemented using any appropriate type of wireless communication protocol. Throughout this description, any reference to the terms such as, "Bluetooth," "short-range communication protocol," "wireless communication protocol," "short-range connection," or "short-range communication link" is merely provided for illustrative purposes. The exemplary embodiments may apply to any appropriate type of communication protocol.

To provide a general example of utilizing a short-range communication protocol, a first UE may communicate with another UE without using a cellular network connection. The first UE and the second UE may communicate with one another using a short-range communication protocol (e.g., Bluetooth, BLE, etc.). Thus, if the first UE and the second UE are within a proximity of one another (e.g., within a distance in which Bluetooth or BLE communications may be performed), the first UE and the second UE may directly exchange signals over the air using a short-range communication link.

In other examples, UEs may communicate with one another using a sidelink. The term "sidelink" generally refers to a communication link between a UE and a further UE. The sidelink provides direct device-to-device (D2D) communication where information and/or data exchanged between the UE and the further UE via the sidelink does not go through a cell. In some configurations, a single sidelink provides bidirectional communication between the UE and the further UE. In other configurations, a single sidelink provides unidirectional communication between the UE and the further UE. The exemplary embodiments may apply to either a bidirectional or unidirectional sidelink.

Sidelink communications are supported by 5G NR and other 3GPP standards. In some configurations, the network may provide information to the UE that indicates how a sidelink is to be established, maintained and/or utilized. Thus, while the information and/or data exchanged over the sidelink does not go through a cell, the UE and the network may exchange information associated with the sidelink. In other configurations, a sidelink is not under the control of the network. In either configuration, the UE and the further UE may still perform synchronization procedures, discovery procedures and exchange control information corresponding to the sidelink.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G new radio (NR) radio access network (RAN) 120. However, the UE 110 may also communicate with other types of networks (e.g., 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have at least a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, base stations and/or access nodes (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The 5G NR RAN 120 may deploy one or more base stations. In the network arrangement 100, the base stations gNB 120A and gNB 120B have been deployed by the 5G NR RAN 120. The gNB 120A may be equipped with the hardware, software and/or firmware configured to support ATG capabilities. Those skilled in the art will understand that ATG generally refers to a base station deployed on the ground that may serve as an access node to devices deployed in the air. In one example, the UE 110 may be located on an airplane and connected directly to the gNB 120A using ATG functionality. In another example, an airplane may be equipped with a system that accesses 5G services via the gNB 120A. Throughout this description, an ATG network may generally refer to a network that has deployed a base station configured to supported ATG communication. Thus, in the network arrangement 100, the 5G NR RAN 120 may support an ATG network.

In some examples, the gNB 120B may control one or more transmission and reception points (TRPs) located on a non-terrestrial component (e.g., a satellite, etc.). The signals exchanged over the air by the non-terrestrial component may be relayed to a terrestrial component (e.g., terrestrial satellite dish, etc.) that may or may not also be controlled by the gNB 120B. In one example, the UE 110 may be located on an airplane and connected directly to the gNB 120B via a satellite or any other appropriate type of non-terrestrial component. In another example, an airplane may be equipped with a system that accesses 5G services via the gNB 120B. Throughout this description, a satellite based NTN may generally refer to a network that has deployed a satellite configured to provide access to network services. Additional details for a satellite based NTN architecture are provided below with regard to the network architecture 200 of FIG. 2.

In the network arrangement 100, the 5G NR RAN 120 may support both an ATG network and a satellite based NTN. However, reference to a single RAN configured to support both an ATG network and a satellite based NTN is merely provided for illustrative purposes. Any appropriate number of ATG networks and/or satellite based NTNs may be supported by a 5G system (or any other appropriate type of wireless communication architecture) using components deployed within and/or outside any appropriate number of RANs.

Those skilled in the art will understand that any association procedure may be performed for the UE 110 to connect to the 5G NR RAN 120 via the gNB 120A or the gNB 120B. For example, as discussed above, the 5G NR RAN 120 may be associated with a particular cellular provider where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific base station, e.g., the gNB 120A or the gNB 120B.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 may also include a positioning server 170. The positioning server 170 may represent hardware, software and/or firmware components configured to receive and provide access to UE positioning information. For example, positioning information of the UE 110 may be provided to the positioning server 170 and an ATC system may be configured to directly or indirectly access the UE positioning information. Thus, the positioning server 170 may have one or more interfaces to communicate with the other components of the network arrangement 100 and/or other systems not shown in the network arrangement 100 (e.g., ATC, etc.).

In the network architecture 100, the positioning server 170 is shown as being outside of the core network 130. However, these examples are merely provided for illustrative purposes. The positioning server 170 may be deployed in any appropriate virtual and/or physical location (e.g., within the mobile network operator's domain or within a third party domain) and implemented via any appropriate combination of hardware, software and/or firmware. It should also be understood that an actual network arrangement may include any appropriate number of positioning servers. Thus, the example of a single positioning server 170 is merely provided for illustrative purposes.

Figure 2:
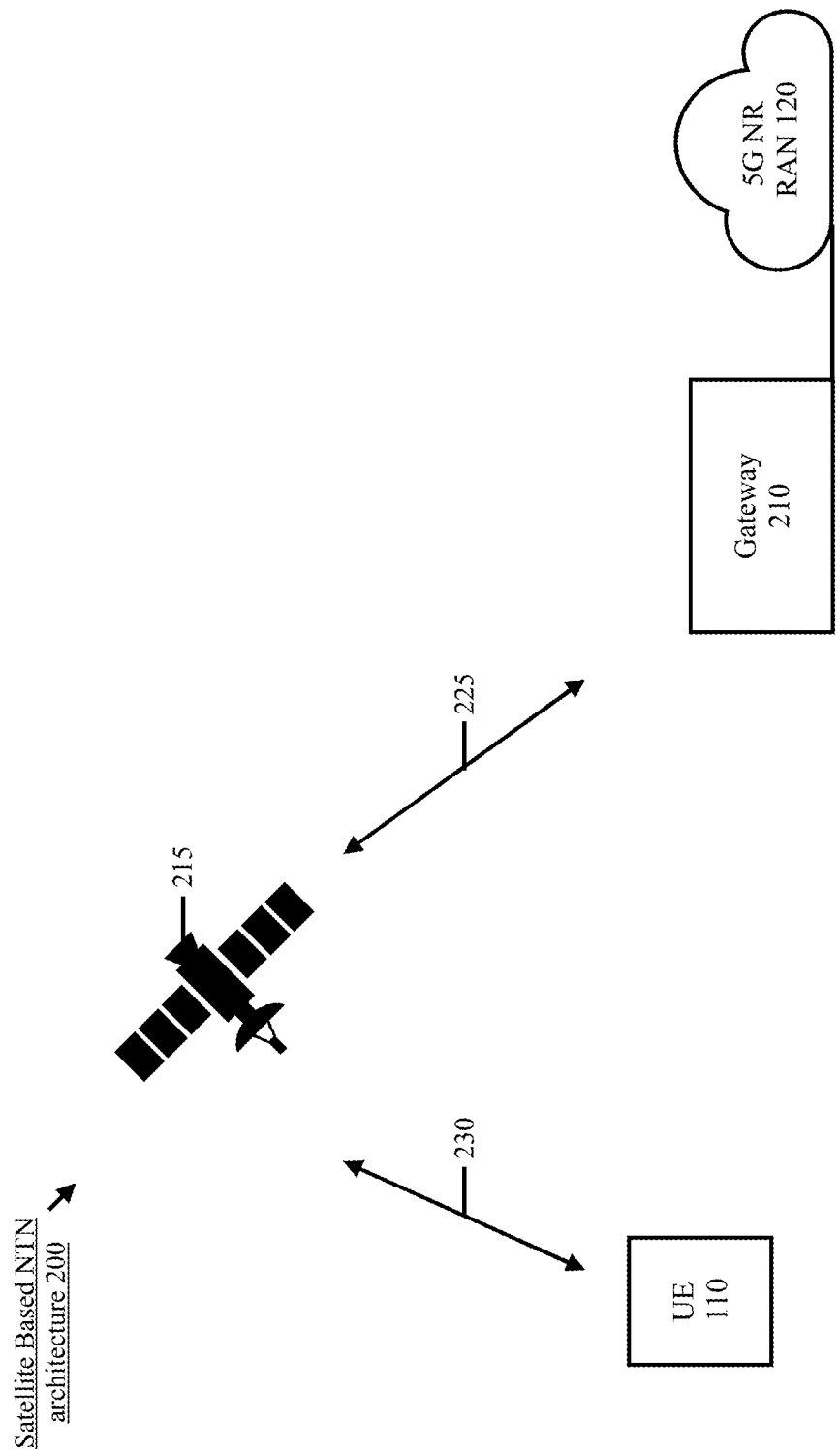
FIG. 2 shows an exemplary satellite based non-terrestrial network (NTN) architecture according to various exemplary embodiments.

FIG. 2 shows an exemplary satellite based NTN architecture 200 according to various exemplary embodiments. The NTN architecture 200 includes one or more satellites 215 integrated with the 5G NR RAN 120. However, reference to a 5G NR RAN is merely provided for illustrative purposes. The exemplary embodiments may be applied to a satellite based NTN that is support by any appropriate type of RAN and/or data network.

The satellite based NTN architecture 200 includes a gateway 210 connecting the 5G NR RAN 120 with the non-terrestrial components. In the NTN architecture 200 of FIG. 2, the gateway 210 and the satellite 215 communicate via a feeder link 225. However, in an actual network architecture, any number of satellites 215 may communicate with any number of gateways 210 via any number or type of communication link. For example, in some NTN deployments, some satellites may be served by several gateways simultaneously.

The satellite 215 may implement a transparent payload or a regenerative payload. A transparent payload refers to an arrangement where the satellite 215 receives signals and transmits an amplified version of the signal, with a frequency conversion. For example, the satellite 215 may receive uplink communications from the UE 110 on service link 230 frequencies and transmit an amplified version of the signal to the 5G NR RAN 120 on feeder link 225 frequencies or may receive downlink communications from the 5G NR RAN 120 on the feeder link 225 frequencies and transmit an amplified version of the signal to the UE 110 on the service link 230 frequencies. A regenerative payload refers to an arrangement where the satellite 215 acts as a distributed unit (DU) of a base station (e.g., the gNB 120B), wherein received signals are regenerated with signal-processing techniques (e.g., demodulation, decoding, switching, encoding, modulation, etc.) before being re-transmitted. The satellite 215 generates one or more beams over a service area bounded by its field of view, which may be dependent on the antenna arrangement and elevation angle of the satellite 215.

With reference to FIG. 1, in a regenerative payload arrangement, the gNB 120B may be located on an aerial component, e.g., the satellite 215 of FIG. 2. In a transparent payload arrangement, the gNB 120B may be located on the ground and the satellite 215 is used to mirror the signals between the gNB 120B and the UE 110, as described above.

The example described above with regard to the architecture 200 of FIG. 2 is not intended to limit the exemplary embodiments in any way. Those skilled in the art will understand that NTNs may be integrated with the 5G NR RAN and/or other networks in any of a variety of manners. For example, a satellite-based NTN may comprise a low earth orbit (LEO) constellation including an array of satellites and gateways with broad interconnectivity via ground-to-ground station (G2G) links, satellite-to-satellite (S2S) links, ground-to-satellite (G2S) links, and satellite-to-ground (S2G) links. Other types of satellite-based NTNs include geostationary-orbiting (GEO) satellites or medium-earth-orbiting (MEO) satellites.

A geostationary (GEO) satellite is an earth-orbiting satellite placed at a specific altitude directly over the equator of the earth. A GEO satellite revolves in the same direction as the rotation of the earth, i.e., west to east, and, at this altitude, orbits the earth once very 24 hours, i.e., the same length of time as the earth requires to rotate once on its axis. Thus, the geostationary satellite appears stationary (or nearly stationary) in the sky relative to a ground-based observer.

The different types of NTNs each have respective strengths and weaknesses and may be deployed in a variety of scenarios, depending on the goal to be achieved, e.g., broad coverage across a large region, concentrated coverage in an urban environment or along a highly trafficked route, etc. Thus, the satellite based NTN architecture 200 described in FIG. 2 is merely provided for illustrative purposes.

Figure 3:
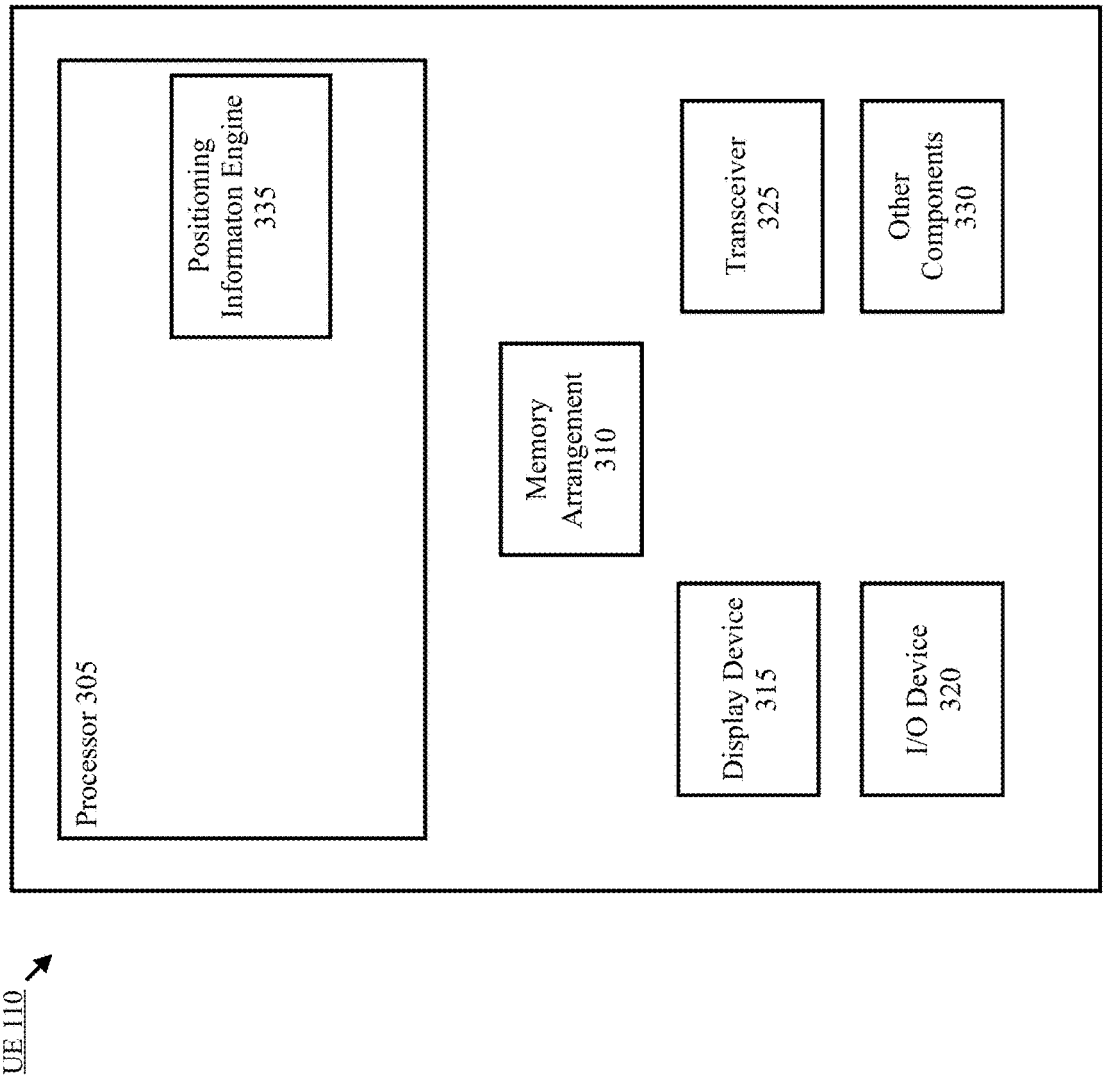
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include a positioning information engine 335. The positioning information engine 335 may perform various operations such as, but not limited to, receiving configuration information, collecting positioning information associated with the UE 110, receiving positioning information from other UEs in a group of UEs and reporting positioning information to the network.

The above referenced engine 335 being an application (e.g., a program) executed by the processor 305 is merely provided for illustrative purposes. The functionality associated with the engine 335 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

Figure 4:
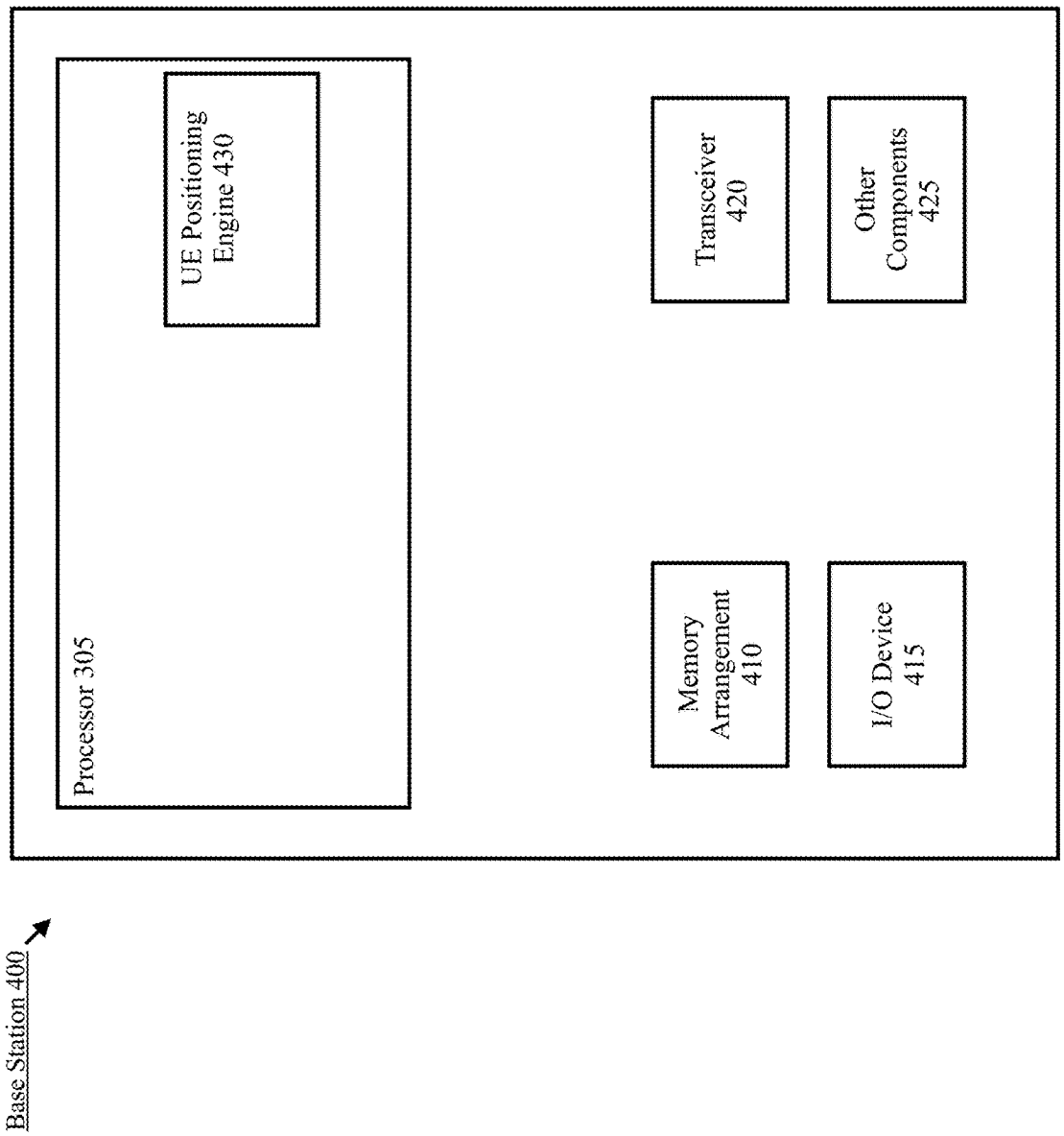
FIG. 4 shows an exemplary base station according to various exemplary embodiments.

FIG. 4 shows an exemplary base station 400 according to various exemplary embodiments. The base station 400 may represent the gNB 120A, the gNB 120B or any other appropriate type of access node through which the UE 110 may establish a connection and manage network operations.

The base station 400 may include a processor 405, a memory arrangement 410, an input/output (I/O) device 415, a transceiver 420, and other components 425. The other components 425 may include, for example, a battery, a data acquisition device, ports to electrically connect the base station to other electronic devices, etc.

The processor 405 may be configured to execute a plurality of engines of the base station 400. For example, the processor 405 of the base station 400 may execute a UE positioning engine 430. The UE positioning engine 430 may perform various operations such as, but not limited to, triggering a UE to report its positioning information and/or the positioning information associated with a group of UEs.

However, reference to a processor 405 is only exemplary. The functionality associated with the engine 430 may also be represented as a separate incorporated component of the base station 400 or may be a modular component coupled to the base station 400, e.g., an integrated circuit with or without firmware. For example, the integrated circuit may include input circuitry to receive signals and processing circuitry to process the signals and other information. In addition, in some base stations, the functionality described for the processor 545 is split among a plurality of processors (e.g., a baseband processor, an applications processor, etc.). The exemplary embodiments may be implemented in any of these or other configurations of a base station.

The memory 410 may be a hardware component configured to store data related to operations performed by the base station 400. The I/O device 415 may be a hardware component or ports that enable a user to interact with the base station 400. The transceiver 420 may be a hardware component configured to exchange data with the UE 110 and any other UE or device. The transceiver 420 may operate on a variety of different frequencies or channels (e.g., set of consecutive frequencies). Therefore, the transceiver 420 may include one or more components (e.g., radios) to enable the data exchange with the various networks and UEs.

According to some aspects, the exemplary embodiments introduce mechanisms for collecting UE position information in an NTN and are described with regard to a scenario in which one or more UEs are located on an airplane. However, while the exemplary embodiments introduced herein may be used to locate an airplane using UE positioning information, the exemplary embodiments are not limited to this type of use case and may be utilized regardless of where the UE is located.

Figure 5:
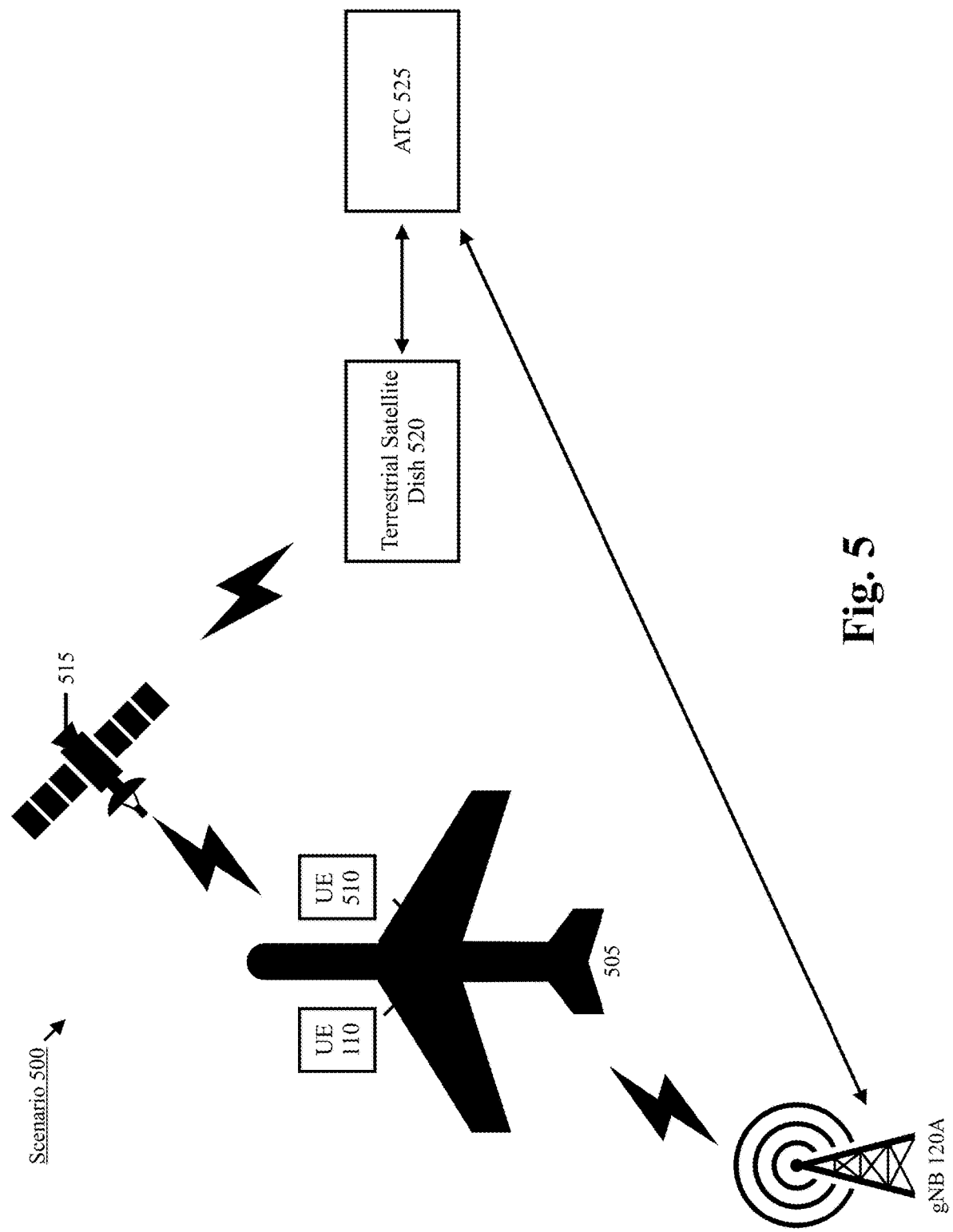
FIG. 5 shows an exemplary scenario according to various exemplary embodiments.

FIG. 5 shows an exemplary scenario 500 according to various exemplary embodiments. The exemplary scenario 500 includes the gNB 120A, an airplane 505, a satellite 515, a terrestrial satellite dish 520 and ATC 525. The airplane 505 may be equipped with one or more systems to facilitate over the air communication with the gNB 120A (e.g., ATG) and the satellite 515 (e.g., satellite based NTN). Typically, the airplane 505 may utilize an ATG network and/or the NTN to support a wireless local area network (WLAN) deployed onboard the airplane 505 that provides devices with access to a data network.

In addition, the airplane 505 may be equipped with GPS and/or GNSS. The airplane 505 positioning information from these systems may be provided to the ATC 525 via the gNB 120A or the satellite 515. For example, the airplane 505 may signal its positioning information to the gNB 120A or the satellite 515 over the air. This information may then be provided to the positioning server 170 of FIG. 1 or any other appropriate type of physical/virtual location that may be accessible by the ATC 525. Thus, in the example scenario 500, the direct connections between the gNB 120A and ATC 525 and between the terrestrial satellite dish 520 and ATC 525 are merely provided for illustrative purposes. Those skilled in the art will understand that the connections shown in the example scenario 500 are not a direct communication link between these components. Instead, the connections between the gNB 120A and the ATC 525 and between the terrestrial satellite dish 520 and the ATC 525 may be facilitated by intervening hardware and software components examples of which are shown in the exemplary network arrangement 100 of FIG. 1 and the exemplary satellite based NTN architecture 200 of FIG. 2.

The ATC 525 may have access to a positioning server (e.g., the positioning server 170 of FIG. 1). Throughout this description, operations that are characterized as being performed by the ATC 525 may be performed by the positioning server and/or any other appropriate component within the mobile network operator's domain or within a third party domain that is implemented using any appropriate combination of hardware, software and/or firmware.

The UE 110 and a UE 510 are both onboard the airplane 505 while it is in the air. In the exemplary scenario 500, it is assumed that an issue has occurred and the airplane 505 is unable communicate its positioning information over the air to either the gNB 120A or the satellite 515. For example, an event may cause the airplane 505 to go radio silent.

The exemplary embodiments introduce mechanisms that may utilize the UEs onboard an airplane to collect positioning information. As will be described in more detail below, some of the exemplary embodiments are based on UEs collecting positioning information derived from downlink signals and reporting the positioning information to the network. Other exemplary embodiments relate to triggering UEs to transmit uplink signals that may provide the basis for deriving UE positioning information.

Figure 6:
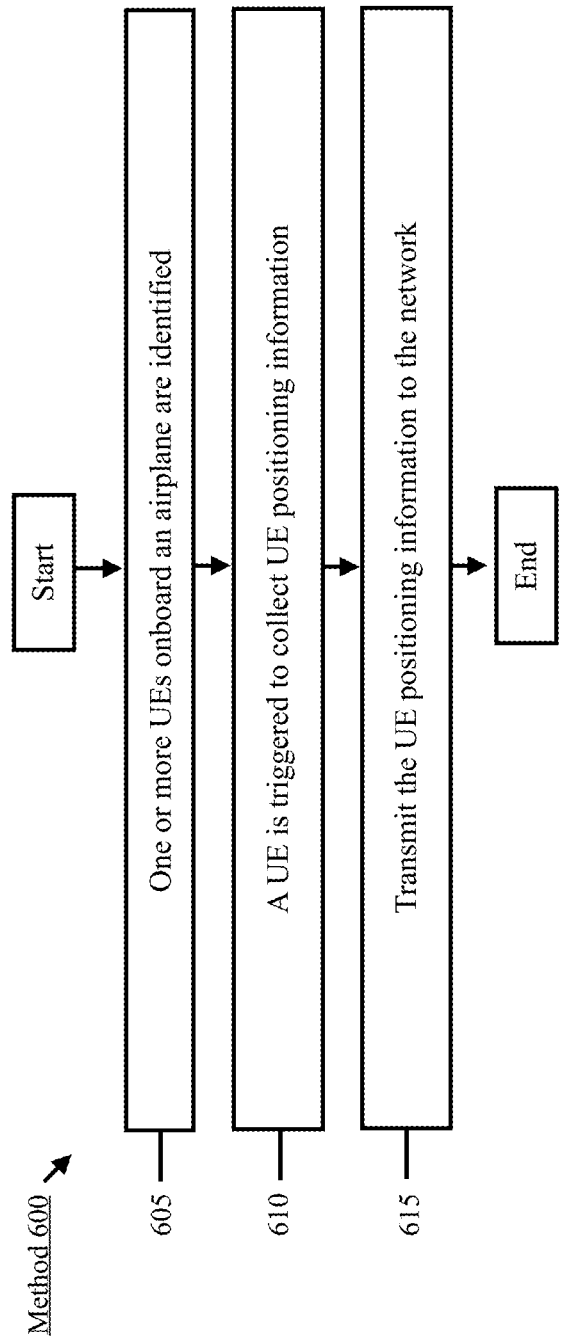
FIG. 6 shows a method for collecting UE positioning information for UEs onboard an airplane according to various exemplary embodiments.

FIG. 6 shows a method 600 for collecting UE positioning information for UEs onboard an airplane according to various exemplary embodiments. The method 600 is described within the context of the scenario 500 of FIG. 5.

In 605, one or more UEs onboard the airplane 505 are identified. This may include identifying whether any of the UEs support ATG or whether any UEs support satellite based NTN. Within the context of the scenario 500, it may be assumed that at least the UE 110 supports both of these capabilities. However, this example is merely provided for illustrative purposes, in an actual operating scenario the UEs on the airplane 505 may support both ATG and satellite based NTN, support only one of ATG and satellite based NTN or support neither ATG nor satellite based NTN.

If a UE is powered on while onboard the airplane 505, the UE capability may be identified from a serving ATG cell or a serving satellite based NTN cell. However, if a UE is powered off while onboard the airplane 505, the UE capability may be identified from a last serving cell of the UE (e.g., a cell providing coverage to the departing airport, etc.).

In some embodiments, one or more components of the 5G system may perform the identifying operations described above with regard to 605. In other embodiments, the ATC 525 and/or any other appropriate system or entity (e.g., a positioning server, etc.) may perform the identifying operations described above with regard to 605. However, these examples are merely provided for illustrative purposes, the exemplary embodiments may utilize any appropriate set of one or more components to perform the identifying in 605.

In 610, the UE 110 is triggered to collect UE positioning information. In 615, the UE 110 transmits the UE positioning information to the network. The UE 110 may report the UE positioning information to the ATC 525, a positioning server or any other appropriate entity via an ATG serving cell or a satellite based NTN serving cell. For example, within the context of the scenario 500, the UE 110 may transmit the UE positioning information over the air to the gNB 120A or the satellite 515. Additional details related to collecting and reporting the UE positioning information (e.g., 610-615) is provided below.

In some embodiments, the ATC 525 (e.g., positioning server, etc.) may use the NTN to trigger the UE 110 to collect UE positioning information and report the results to the ATC 525. For example, the network may transmit an explicit or implicit signal from the satellite 515 configured to trigger NTN capable UEs to report UE positioning information. In another example, the UE 110 may be preconfigured to monitor for certain types of conditions, events and/or signals. During operation, the network may intentionally activate UE positioning reporting and/or the UE 110 may be triggered to report UE positioning information when certain conditions are present. There may be scenarios where the UE 110 is not connected to a satellite based NTN serving cell when the UE 110 is triggered to report UE positioning information. Thus, in some scenario, the UE 110 may have to connect to a satellite based NTN cell (e.g., satellite 515) before reporting UE positioning information to the ATC 525.

In one example, the UE 110 may support UE based GPS positioning. Therefore, in 610, the UE 110 may retrieve its positioning information from other internal UE mechanisms. The UE 110 may then report its positioning information to the ATC 525 via the satellite 515. The ATC 525 may be able to locate the airplane 505 based on the UE 110 positioning information since the UE 110 is onboard the airplane 505.

In another example, the UE 110 may support network assisted downlink positioning (e.g., observed time difference of arrival (OTODA), etc.). Therefore, the NTN may transmit one or more downlink signals to the UE 110. The UE 110 may then collect measurement data based on the one or more downlink signals (e.g., difference in arrival time, signal strength, etc.) and report the measurement data to the ATC 525 (e.g., positioning server). The ATC 525 may be able to locate the airplane 505 based on the UE 110 positioning information since the UE 110 is onboard the airplane 505.

In some embodiments, the ATC 525 (e.g., positioning server, etc.) may use ATG to trigger the UE 110 to collect UE positioning information and report the results to the ATC 525. For example, the network may transmit an explicit or implicit signal from the gNB 120A to trigger ATG capable UEs to report UE positioning information. In another example, the UE 110 may be preconfigured to monitor for certain types of conditions, events and/or signals. During operation, the network may intentionally activate UE positioning reporting and/or the UE 110 may be triggered to report UE positioning information when certain conditions are present. There may be scenarios where the UE 110 is not connected to a ATG serving cell when the UE 110 is triggered to report UE positioning information. Thus, in some scenario, the UE 110 may have to connect to a ATG cell (e.g., gNB 120A) before reporting UE positioning information to the ATC 525.

In one example, the UE 110 may support UE based GPS positioning. Therefore, in 610, the UE 110 may retrieve its positioning information from other internal UE mechanisms. The UE 110 may then report its positioning information to the ATC 525 via the gNB 120A. The ATC 525 may be able to locate the airplane 505 based on the UE 110 positioning information since the UE 110 is onboard the airplane 505.

In another example, the UE 110 may support network assisted downlink positioning (e.g., OTODA, etc.). Therefore, the network may transmit one or more downlink signals to the UE 110. The UE 110 may then collect measurement data based on the one or more downlink signals (e.g., difference in arrival time, signal strength, etc.) and report the measurement data to the ATC 525 (e.g., positioning server). The ATC 525 may be able to locate the airplane 505 based on the UE 110 positioning information since the UE 110 is onboard the airplane 505.

As indicated above, the ATC 525 (e.g., positioning server), may collect the UE positioning information from satellite based NTN capable UEs and ATG capable UEs. In some embodiments, the positioning server may treat multiple UEs on a same airplane as a single UE to increase the measured positioning anchor points. For instance, UEs that support NTN may measure downlink positioning signals from one or more satellites and UEs that support ATG may measures downlink positioning signals from one or more terrestrial gNBs. The measurement data is reported to the positioning server by multiple UEs. The positioning server may then use all of the measurement data to derive an airplane 505 location.

Returning to the scenario 500 of FIG. 5, assume that the UE 510 is ATG capable and/or satellite based NTN capable. However, the UE 510 is unable to retrieve UE positioning information from other internal mechanisms (e.g., GPS) nor is the UE 510 able to collect measurement data from an ATG network or satellite based NTN network. In this type of scenario, the UE 510 may establish a direct connection to another UE on the same airplane 505 (e.g., UE 110, etc.). For example, the UE 510 and the UE 110 hay establish a short-range connection (e.g., Bluetooth, etc.) or a sidelink connection. The UE 510 may request GPS location information and/or measurement data from the UE 110, receive the GPS location information and/or measurement data from the UE 110 over the direct connection and then report the GPS location information and/or measurement data to the ATC 525 over the air via a ATG or satellite based NTN cell.

Figure 7:
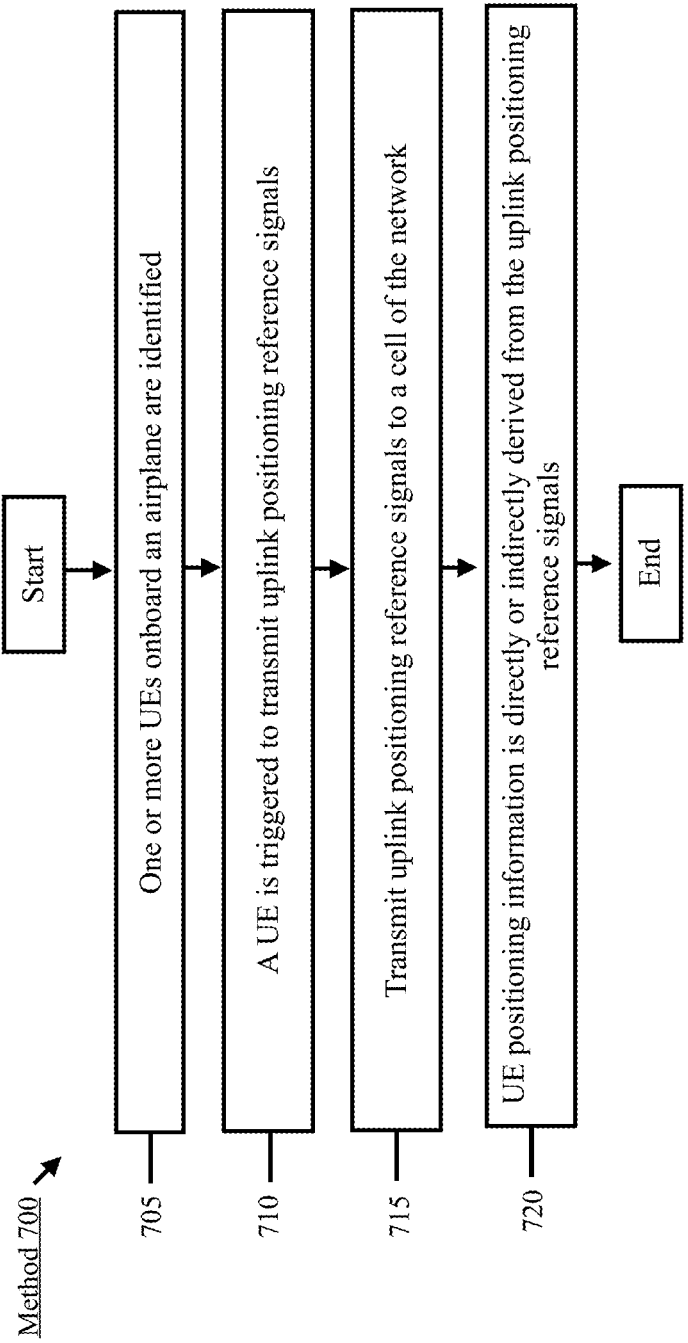
FIG. 7 shows a method for collecting UE positioning information for UEs onboard an airplane according to various exemplary embodiments.

FIG. 7 shows a method 700 for collecting UE positioning information for UEs onboard an airplane according to various exemplary embodiments. The method 700 is described within the context of the scenario 500 of FIG. 5.

In 705, one or more UEs onboard the airplane 505 are identified. This is substantially similar to 605 of the method 600. However, in contrast to the method 600 where the UEs report positioning information and/or measurement data to the ATC 525, the method 700 relates to the UEs onboard the airplane transmitting uplink positioning reference signals.

In 710, the UE 110 is triggered to transmit uplink positioning reference signals. Throughout this description, the term "uplink positioning reference signals" may refer to a sounding reference signal (SRS) or any other appropriate type of uplink signal that may be used to directly or indirectly derive measurement data and/or UE positioning information. Thus, any reference to the uplink positioning reference signals being a particular type of signal is provided for illustrative purposes.

In 715, the UE 110 transmits uplink positioning reference signals to a cell of the network. For example, within the context of the scenario 500, the satellite 515 or the gNB 120A may receive uplink positioning reference signals from the UE 110. In 720, UE positioning information is directly or indirectly derived from the uplink positioning reference signals. For example, measurement data may be derived based on the uplink positioning reference signals which may then be used to determine a UE location. Thus, the measurement data and/or UE positioning information may enable ATC 525 to locate the airplane 505.

In some embodiments, the ATC 525 (e.g., positioning server, etc.) may use the NTN to trigger the UE 110 to transmit uplink positioning reference signals. For example, the network may transmit an explicit or implicit signal from the satellite 515 configured to trigger NTN capable UEs to transmit uplink positioning reference signals. In another example, the UE 110 may be preconfigured to monitor for certain types of conditions, events and/or signals. During operation, the network may intentionally activate uplink positioning reference signal transmission and/or the UE 110 may be triggered to perform uplink positioning reference signal transmission when certain conditions are present.

In other embodiments, the ATC 525 (e.g., positioning server, etc.) may use the ATG network to trigger the UE 110 to transmit uplink positioning reference signals. For example, the network may transmit an explicit or implicit signal from the gNB 120A that is configured to trigger ATG capable UEs to transmit uplink positioning reference signals. In another example, the UE 110 may be preconfigured to monitor for certain types of conditions, events and/or signals. During operation, the network may intentionally activate uplink positioning reference signal transmission and/or the UE 110 may be triggered to perform uplink positioning reference signal transmission when certain conditions are present.

In one example, there may be dedicated time and frequency resources for uplink positioning reference signal transmission (e.g., specific symbols/slots, bandwidth, frequency bands, etc.). In some embodiments, the UE 110 may transmit the uplink positioning reference signal using a maximum transmission power. Thus, after the UE 110 is triggered to transmit uplink positioning reference signals, the UE 110 knows which time and frequency resources to use for uplink positioning reference signal transmission without receiving any explicit resource allocation information.

In another example, the network may configure the UE 110 with time and frequency resources that may be utilized for uplink positioning reference signal transmission. Thus, after the UE 110 is triggered to transmit uplink positioning reference signals, the UE 110 utilize the time and frequency resources assigned to the UE 110 by the network for uplink positioning reference signal transmission.

Returning to the scenario 500 of FIG. 5, assume that the UE 510 is ATG capable and/or satellite based NTN capable. However, the UE 510 is unable to retrieve UE positioning information from other internal mechanisms (e.g., GPS) nor is the UE 510 able to collect measurement data from an ATG network or satellite based NTN network. In this type of scenario, the UE 510 may establish a direct connection to another UE on the same airplane 505 (e.g., UE 110, etc.). For example, the UE 510 and the UE 110 may establish a short-range connection (e.g., Bluetooth, etc.) or a sidelink connection. The UE 510 may request GPS location information and/or measurement data from the UE 110, receive the GPS location information and/or measurement data from the UE 110 over the direct connection and then report the GPS location information and/or measurement data to the ATC 525 over the air via a ATG or satellite based NTN cell.

Returning to the scenario 500 of FIG. 5, assume that the UE 510 is ATG capable and/or satellite based NTN capable. However, the UE 510 is unable to transmit uplink positioning reference signals. In this type of scenario, the UE 510 may establish a direct connection to another UE on the same airplane 505 (e.g., UE 110, etc.). For example, the UE 510 and the UE 110 hay establish a short-range connection (e.g., Bluetooth, etc.) or a sidelink connection. The UE 510 may request that the UE 110 transmit the uplink positioning reference signals to enable the ATC 525 to locate the airplane 525.

In some embodiments, the UE 510 may receive uplink positioning reference signal configuration information (e.g., time and frequency resources, etc.) from the network and provide this information to the UE 110 over the sidelink/ short-range connection. The UE 110 may use the uplink positioning reference signal configuration provided by the UE 510 to perform the uplink positioning reference signal transmissions. In other embodiments, the UE 110 may use dedicated time and frequency resources to perform the uplink positioning reference signal transmissions.

In some scenarios, in addition to the UEs 110 and 510, there may be multiple additional UEs on the airplane 505. In this type of scenario, the UE 510 may request that all available UEs on the airplane 505 transmit the same uplink positioning reference signals (e.g., transmit diversity gain). The request may be transmitted over a sidelink, using a short-range communication protocol (e.g., Bluetooth, etc.) or any other appropriate signaling mechanism. The other UEs may use the dedicated uplink positioning reference signal configuration or may use the uplink positioning reference signal configuration provided by the UE 510.

Some of the examples described above related to collecting and reporting UE positioning information from multiple UEs deployed in a same location (e.g., airplane 605). The exemplary embodiments introduced below include additional techniques for collecting and reporting positioning information from a group of UEs. It has been identified that when multiple UEs gather in a certain area (e.g., airplane, train, bus, building, field, etc.), group positioning information may be utilized rather than individual UE positioning information to minimize signaling overhead and improve positioning accuracy. In the exemplary embodiments described below, the UEs in a group may be connected to one another using a wireless communication link, e.g., short-range communication protocol, sidelink, etc.

Figure 8:
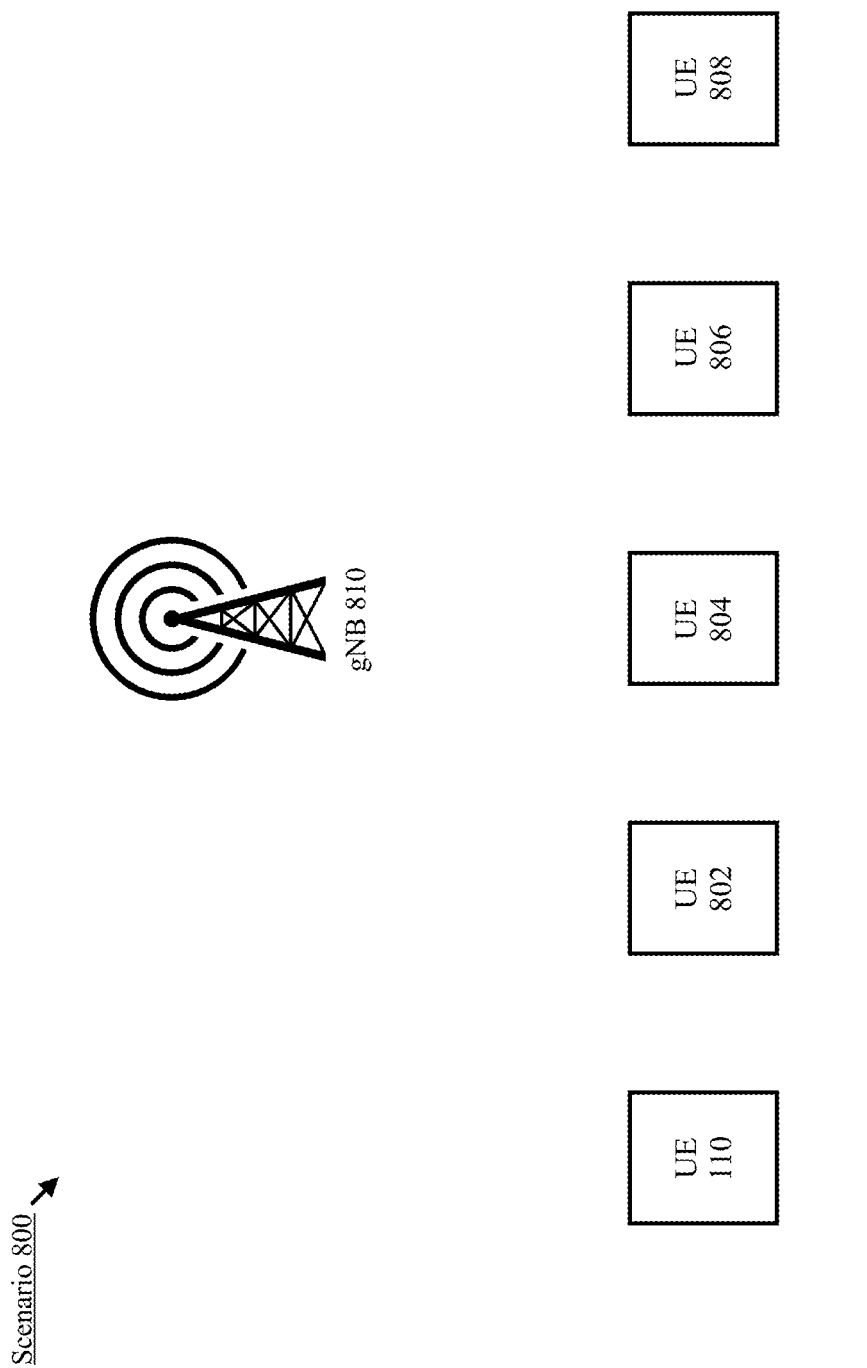
FIG. 8 shows a scenario according to various exemplary embodiments

FIG. 8 shows a scenario 800 according to various exemplary embodiments. The scenario 800 includes a group of UEs comprising the UE 110 and UEs 802-808. The group of UEs may be deployed within a general vicinity of one another (e.g., airplane, train, bus, building, field, etc.). In addition, the scenario 800 shows a gNB 810 that may support ATG communication and/or satellite based NTN.

The UE 110 may have a connection to one or more of the other UEs in the group (e.g., UEs 802-808). The connection may be a sidelink connection, a short-range connection (e.g., Bluetooth, BLE, etc.) or any other appropriate type of wireless connection.

According to some aspects, the network and/or a UE may utilize the following type of criteria to assign UEs to a same group. In one example, a set of UEs that are associated with a sidelink reference signal received power (RSRP) that is above a threshold value may be assigned to a same group. In another example, a set of UEs connected to a same service set ID (SSID) (e.g., WLAN, WiFi, etc.) may be assigned to a same group. However, the exemplary embodiments are not limited to the examples provided above and may utilize any appropriate parameters, identifiers and/or conditions to form a group of UEs. In this example, it is assumed that the UE 110 and the UEs 802-808 satisfy any appropriate type of criteria to be considered a group of UEs.

One or more UEs in the group may report group information to the network. For example, the UE 110 may report the other UE IDs to the network to indicate which UEs are in the group with the UE 110. In another example, the UE 110 may report a sidelink RSRP and the other UE IDs to the network to indicate which UEs are in the group with the UE 110. In a further example, the one or more UEs may report an SSID of a WLAN connection. The network may determine that UEs which report the same SSID are in the same group. However, the exemplary embodiments are not limited to the examples provided above and may utilize report appropriate parameters, identifiers and/or conditions to identify a group of UEs.

Figure 9:
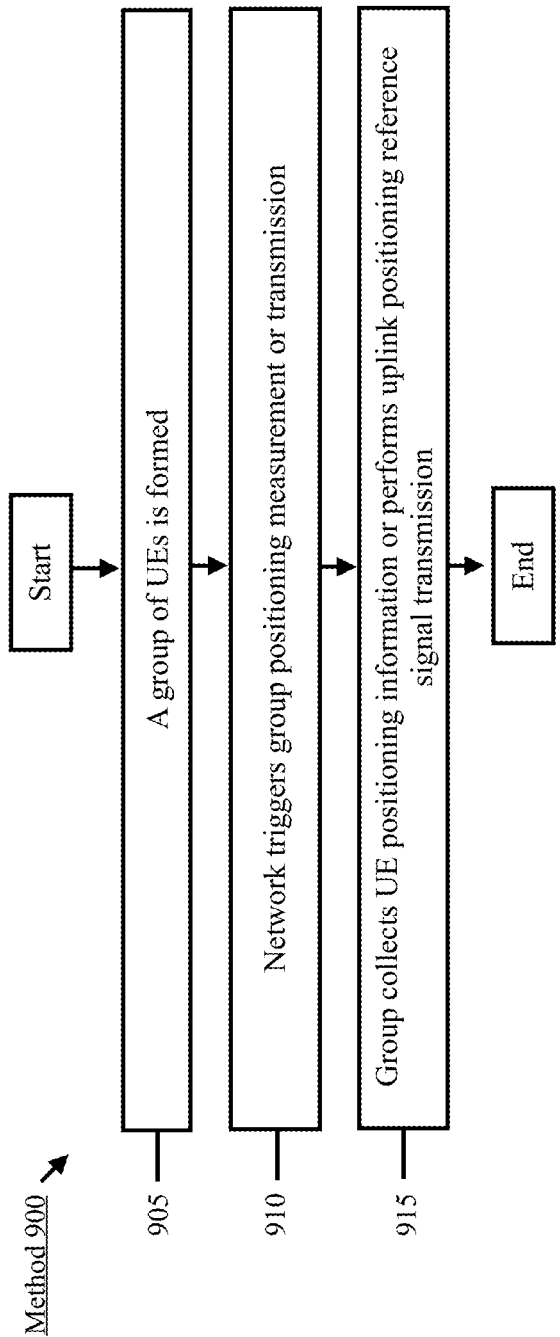
FIG. 9 shows a method for collecting UE group positioning information according to various exemplary embodiments.

FIG. 9 shows a method 900 for collecting UE group positioning information according to various exemplary embodiments. The method 900 is described within the context of the scenario 800 of FIG. 8.

In 905, a group of UEs is formed. As described above, the network and/or one of the UEs may assign UEs to a same group based on any appropriate type of parameter, identifier and/or condition. For example, the UE 110 may form a group with the UEs 802-808 because the UEs 802-808 have a sidelink RSRP over a threshold value. In another example, the NTN and/or the 5G network may form a group comprising the UEs 110, 802-808 because each of the UEs are connected to a same SSID. However, the exemplary embodiments are not limited to the examples provided above, one or more UEs and/or the network may form a group of UEs on any appropriate basis.

In 910, the network triggers group positioning measurement or transmission. In 915, the group may collect UE positioning information for or perform uplink positioning reference signal transmission. In some examples, the gNB 802 may communicate with at least one of the UEs in a group (e.g., the UE 110). The at least one UE may then communicate with other UEs in the same group over a sidelink, short-range communication link or any other appropriate wireless connection. Throughout this description, a UE that is configured to relay signals and/or information between the network and other UEs in the same group may be referred to a "reference UE." However, the term reference UE is merely provided for illustrative purposes. Different entities may refer to a similar concept by a different name.

For group positioning measurement, one or more UEs in a same group may collect measurement data based on downlink positioning reference signals. Since different UEs of the same group may be able to detect difference anchor points (e.g., satellites, TRPs, cells, etc.), the number of observed anchor points for the group may be increased compared to the number of observed anchor points for a single UE. Increasing the number of anchor points may improve positioning accuracy.

In one example, the network may trigger group positioning measurement via a reference UE. For example, the gNB 802 may send a signal to the UE 110 or a predetermined condition may occur that triggers the UE 110 to request that the other UEs in the same group collect measurement data from ATG cells, satellite based NTN cells or any other appropriate type of cell. The other UEs in the group may then report the measurement data to the UE 110 and the UE 110 may then provide the group measurement data to the network via the gNB 802.

For group positioning transmission, one or more UEs in a same group may perform an uplink positioning reference signal transmission at a same time using a same positioning reference signal sequence. Using the group approach for the uplink positioning reference signal transmission provides transmitter diversity gain.

In another example, the network may trigger group positioning transmission via a reference UE. For example, the gNB 802 may send a signal to the UE 110 or a predetermined condition may occur that triggers the UE 110 to request that the other UEs transmit uplink positioning reference signals to ATG cells, satellite based NTN cells or any other appropriate type of cell. In addition, the UE 110 may request that other UEs 802-808 synchronize in time for the uplink positioning reference signal transmission and/or utilize synchronized time and frequency resources. The other UEs in the group may then perform the uplink positioning reference signal transmission in response to the request by the reference UE.

Instead of using a reference UE, the network may individually trigger each of the UEs in the same group for positioning measurement or transmission. For example, the gNB 802 may send a signal to each of the UEs 110, 802-808 or a predetermined condition may occur that triggers the UEs 110, 802-808 to collect measurement data from ATG cells, satellite based NTN cells or any other appropriate type of cell. In some embodiments, the UEs 110, 802-808 may each individually report the measurement data to a serving cell. In other embodiments, a subset of UEs may gather the measurement data collected by the other UEs of the group using sidelink communication and/or short-range communication between the members of the group and report the measurement data on behalf of the group. Thus, even though each UE was individually triggered, not every UE of the group has to report their measurement data directly to the network. In another example, the gNB 802 may send a signal to each of the UEs 110, 802-808 or a predetermined condition may occur that triggers the UEs 110, 802-808 to perform uplink positioning reference signal transmission.

A group of UEs may comprise one or more UEs that support ATG and/or satellite based NTN and one or more UEs that do not support either ATG or satellite based NTN and/or are out of cellular coverage. In this type of scenario, the network may trigger. For example, in some scenarios, the UE 110 may have a sidelink or a short-range connection to one or more UEs that do not support ATG or satellite based NTN. The network may trigger UE 110 to report group positioning information and/or positioning measurement data. Thus, the UE 110 may request the other UEs in the same group provide UE based positioning information and/or perform measurements on downlink positioning reference signals. The other UEs may then report this information to the UE 110 over the sidelink or short-range connection. The UE 110 may then report the group positioning information to the network via its ATG or satellite based NTN connection.

Figure 10:
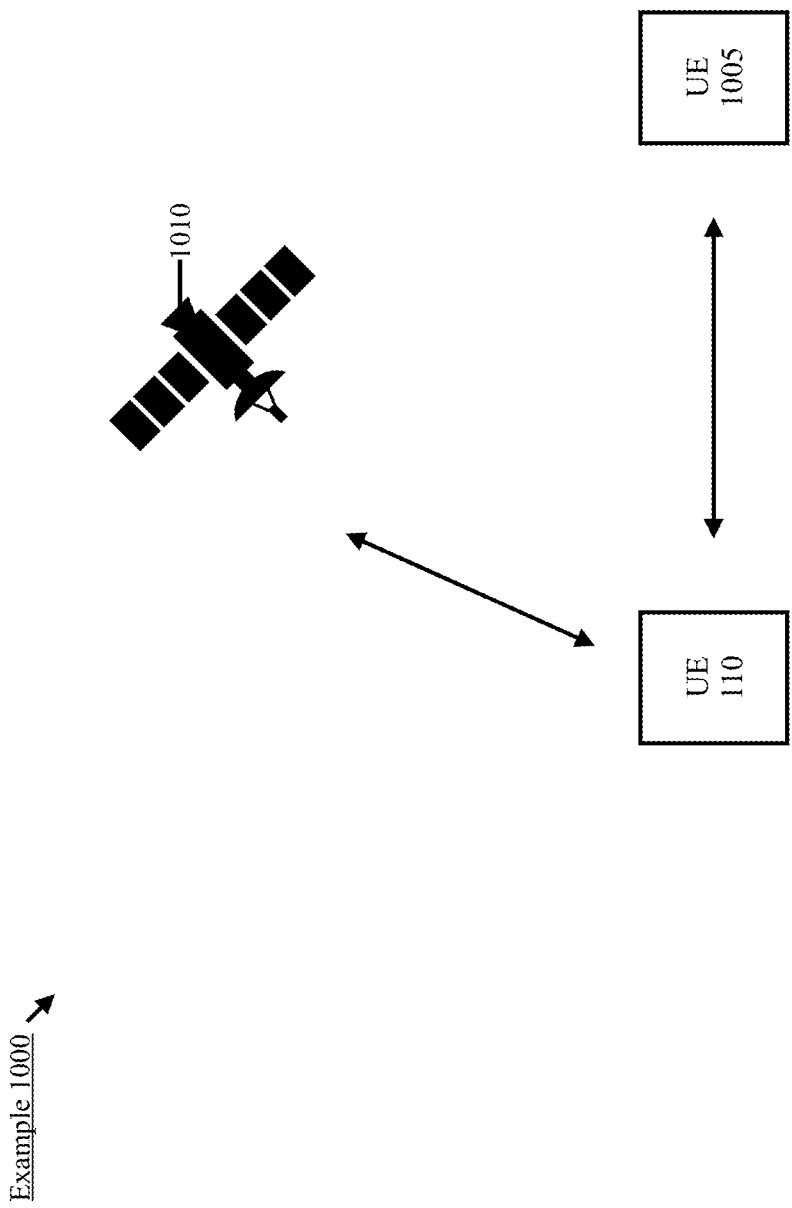
FIG. 10 shows an example of reporting UE positioning information according to various exemplary embodiments.

FIG. 10 shows an example 1000 of reporting UE positioning information according to various exemplary embodiments. The example 1000 includes the UE 110, a UE 1005 and a satellite 1010. The UE 110 supports satellite based NTN and is configured to communicate with the network via the satellite 1010. The UE 1010 has access to its own UE based positioning information and/or is capable of downlink positioning measurement but the UE 1010 is out of cellular coverage. In the example 1000, the UE 1005 may provide positioning information to the UE 110 and the UE 110 may relay the positioning information for the UE 110 and the UE 1005 via the satellite 1010.

EXAMPLES

In a first example, a processor of a user equipment (UE) is configured to perform operations, comprising reporting group information indicating that the UE is part of a group of UEs, the group of UEs comprising at least the UE and a second UE, collecting UE positioning information, the UE positioning information comprising information associated with at least the UE and reporting the UE positioning information to a non-terrestrial network (NTN).

In a second example, the processor of the first example, wherein each UE in the group is associated with a sidelink parameter that satisfies a threshold.

In a third example, the processor of the first example, wherein the group information comprises a same service set ID (SSID) of a network connection.

In a fourth example, the processor of the first example, wherein the group information comprises a UE ID for each UE in the group.

In a fifth example, the processor of the first example, wherein the group information comprises a sidelink reference signal received power (RSRP) and UE ID for each UE in the group.

In a sixth example, the processor of the first example, wherein the UE positioning information further comprises information associated with the second UE.

In a seventh example, the processor of the first example, wherein each UE in the group reports UE positioning information.

In an eighth example, the processor of the first example, wherein the UE positioning information comprises measurement data from each UE in the group, the measurement data derived based on downlink positioning reference signals.

In a ninth example, the processor of the first example, wherein the second UE is out of cellular coverage.

In a tenth example, the processor of the ninth example, wherein the second UE is not satellite based NTN capable.

In an eleventh example, the processor of the ninth example, wherein the second UE is not air-to-ground (ATG) capable.

In a twelfth example, a processor of a user equipment (UE) is configured to perform operations, comprising reporting group information indicating that the UE is part of a group of UEs, the group of UEs comprising at least the UE and a second UE and transmitting uplink positioning reference signals to a cell of a non-terrestrial network (NTN).

In a thirteenth example, the processor of the twelfth example, wherein each UE in the group is associated with a sidelink parameter that satisfies a threshold.

In a fourteenth example, the processor of the twelfth example, wherein the group information comprises a same service set ID (SSID) of a network connection.

In a fifteenth example, the processor of the twelfth example, wherein the group information comprises a UE ID for each UE in the group.

In a sixteenth example, the processor of the twelfth example, wherein the group information comprises a sidelink reference signal received power (RSRP) and UE ID for each UE in the group.

In a seventeenth example, the processor of the twelfth example, wherein each UE in the group of UEs transmits the uplink positioning reference signals to the NTN.

In an eighteenth example, the processor of the seventeenth example, wherein each UE in the group of UEs uses a same reference signal sequence for the uplink positioning reference signals.

In a nineteenth example, the processor of the seventeenth example, wherein each UE in the group of UEs transmits the uplink positioning reference signals at the same time and frequency resource.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

As described above, one aspect of the present technology is the gathering and use of data available from specific and legitimate sources. The present disclosure contemplates that in some instances, this gathered data may include personal information data that uniquely identifies or can be used to identify a specific person. Such personal information data can include location data, positioning information, online identifiers, UE identifiers, SSIDs, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, UE positioning information may be used to locate an airplane when the airplane is radio silent. The present disclosure contemplates that those entities responsible for the collection, analysis, disclosure, transfer, storage, or other use of such personal information data will comply with well-established privacy policies and/or privacy practices.

In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the UE positioning information may be anonymous and may only be stored in the positioning server for limited time durations.

It is the intent of the present disclosure that personal information data should be managed and handled in a way to minimize risks of unintentional or unauthorized access or use. In addition to the examples provided above, risk can be minimized by limiting the collection of data and deleting data once it is no longer needed. When applicable, data de-identification can be used to protect a user's privacy. De-identification may be facilitated, when appropriate, by removing identifiers, controlling the granularity or specificity of data stored, controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    collecting UE positioning information configured to indicate a location of the UE, wherein the UE is deployed onboard an airplane;
    reporting the UE positioning information to a cell of a non-terrestrial network (NTN); and
    generating, for transmission to the cell of the NTN, uplink positioning reference signals, wherein a group of UEs comprising at least the UE and a second UE transmit the uplink positioning reference signals using a same time and frequency resource.

2. The processor of claim 1, wherein the cell is a satellite based NTN cell and wherein the UE is triggered to report the UE positioning information to locate the airplane.

3. The processor of claim 1, wherein the cell is an air-to-ground (ATG) cell and wherein the UE is triggered to report the UE positioning information to locate the airplane.

4. The processor of claim 1, wherein the UE positioning information comprises UE based location information derived from a global positioning system (GPS) internal to the UE.

5. The processor of claim 1, wherein the UE positioning information comprises measurement data derived based on downlink positioning reference signals.

6. The processor of claim 5, wherein the downlink positioning reference signals are transmitted by one or more satellite based NTN cells of a fifth generation (5G) network.

7. The processor of claim 5, wherein the downlink positioning reference signals are transmitted by one or more air-to-ground (ATG) cells of a fifth generation (5G) network.

8. The processor of claim 1, the operations further comprising:
    establishing a communication link to a second UE, wherein the UE positioning information comprises measurement data received from the second UE via the communication link, the measurement data derived based on downlink positioning reference signals.

9. A processor of a user equipment (UE) configured to perform operations, the operations comprising:
    establishing a communication link to a second UE;
    receiving, from the second UE via the communication link, a request for uplink positioning reference signals, wherein the uplink positioning reference signals are to indicate a location of the UE and wherein the UE is deployed on an airplane;
    receiving configuration information for the uplink positioning reference signals comprising time and frequency resources on which the uplink positioning reference signals are to be transmitted by the second UE; and
    generating, for transmission to a cell of a non-terrestrial network (NTN), the uplink positioning reference signals.

10. The processor of claim 9, wherein the cell is a satellite based NTN cell of a fifth generation (5G) network and wherein the UE is triggered to transmit the uplink positioning reference signals to locate the airplane.

11. The processor of claim 9, wherein the cell is an air-to-ground (ATG) cell of a fifth generation (5G) network and wherein the UE is triggered to transmit the uplink positioning reference signals to locate the airplane.

12. The processor of claim 9, wherein the uplink positioning reference signals are transmitted on dedicated time and frequency resources using a transmission power.

13. The processor of claim 12, wherein the transmission power is a preconfigured transmission power or UE maximum transmission power.

14. The processor of claim 9, the operations further comprising:
    receiving configuration information for the uplink positioning reference signals comprising time and frequency resources on which the uplink positioning reference signals are to be transmitted.

15. The processor of claim 9, wherein the communication link is a short-range communication link.

16. The processor of claim 9, wherein the communication link is a sidelink.

17. The processor of claim 9, wherein a group of UEs comprising at least the UE and the second UE transmit the uplink positioning reference signals.

18. The processor of claim 17, wherein the group of UEs use a same time and frequency resource to transmit the uplink positioning reference signals.

19. The processor of claim 9, the operations further comprising:
    deriving measurement data derived based on downlink positioning reference signals.

20. The processor of claim 19, wherein the downlink positioning reference signals are transmitted by one or more satellite based NTN cells of a fifth generation (5G) network.

* * * * *